(12) United States Patent
Rolfes et al.

(10) Patent No.: US 8,631,936 B2
(45) Date of Patent: Jan. 21, 2014

(54) RECYCLABLE DRUM HAVING INWARDLY FOLDED END PORTIONS

(75) Inventors: Adam Rolfes, Celina, OH (US); Sanjeev Thapa, Troy, OH (US); Steve Barhorst, Sidney, OH (US)

(73) Assignee: Hobart Brothers Company, Troy, OH (US)

( * ) Notice: Subject to any disclaimer, the term of this patent is extended or adjusted under 35 U.S.C. 154(b) by 1094 days.

(21) Appl. No.: 11/949,602

(22) Filed: Dec. 3, 2007

(65) Prior Publication Data

US 2008/0149513 A1  Jun. 26, 2008

Related U.S. Application Data

(60) Provisional application No. 60/876,841, filed on Dec. 22, 2006.

(51) Int. Cl.
  *B65D 85/00* (2006.01)

(52) U.S. Cl.
  USPC ........... 206/407; 206/408; 206/409; 206/389; 229/5.5

(58) Field of Classification Search
  USPC ........ 206/407–409, 525, 525.1, 389; 229/5.5, 229/425, 508, 93, 122.13; 493/269, 272, 493/282, 295, 296, 308
  See application file for complete search history.

(56) References Cited

U.S. PATENT DOCUMENTS

| | | | | |
|---|---|---|---|---|
| 156,591 A * | 11/1874 | Powers | | 229/5.8 |
| 1,866,496 A * | 7/1932 | Witte | | 229/5.5 |
| 2,014,901 A * | 9/1935 | Leopold et al. | | 229/5.5 |
| 2,016,863 A * | 10/1935 | La Grua | | 229/5.5 |
| 2,568,284 A * | 9/1951 | Harrison | | 83/695 |
| 2,775,385 A * | 12/1956 | Gibbs, Jr. | | 229/5.5 |
| 3,713,576 A * | 1/1973 | Goebel | | 229/128 |
| 3,901,431 A * | 8/1975 | Carlson | | 229/4.5 |
| 4,205,775 A | 6/1980 | Swan | | |
| 4,274,607 A | 6/1981 | Priest | | |
| 4,289,265 A * | 9/1981 | Ellerbrock | | 229/5.5 |
| 5,105,943 A * | 4/1992 | Lesko et al. | | 206/397 |
| 5,819,934 A * | 10/1998 | Cooper | | 206/397 |
| 5,909,842 A * | 6/1999 | Allmon | | 229/404 |
| 6,857,521 B2 | 2/2005 | Cantu-Gonzalez | | |
| 7,017,742 B2 * | 3/2006 | Dragoo et al. | | 206/408 |
| 7,152,735 B2 | 12/2006 | Dragoo et al. | | |
| 7,172,070 B2 * | 2/2007 | Coon et al. | | 206/397 |
| 7,325,683 B2 * | 2/2008 | Bae et al. | | 206/397 |
| 8,245,846 B2 * | 8/2012 | Nicklas | | 206/395 |
| 2003/0192802 A1 * | 10/2003 | Dragoo et al. | | 206/408 |
| 2006/0124489 A1 | 6/2006 | Dragoo et al. | | |
| 2007/0074987 A1 | 4/2007 | Dragoo et al. | | |

FOREIGN PATENT DOCUMENTS

| | | |
|---|---|---|
| EP | 1057751 B1 | 8/2003 |
| GB | 122960 A | 2/1919 |

\* cited by examiner

*Primary Examiner* — J. Gregory Pickett
*Assistant Examiner* — Blaine Neway
(74) *Attorney, Agent, or Firm* — Fletcher Yoder P.C.

(57) ABSTRACT

A wire container having a housing consisting essentially of recyclable material is provided. The housing has a peripheral wall defining a boundary leading from a first end to a second end of the housing, a plurality of end portions folded inwardly at the second end to define an end wall, and a plurality of support structures coplanar with and coupled to the end wall and extending across the plurality of end portions. A welding wire and container assembly is also provided, in which a coil of welding wire is disposed in the housing and support by the base.

17 Claims, 9 Drawing Sheets

RECYCLABLE DRUM HAVING INWARDLY FOLDED END PORTIONS

CROSS REFERENCE TO RELATED APPLICATIONS

This application claims priority to and the benefit of U.S. Provisional Application No. 60/876,841, entitled "Recyclable Drum Having Inwardly Folded End Portions," filed Dec. 22, 2006, the disclosure of which is incorporated herein by reference.

BACKGROUND

Drums are used to store a variety of products and materials, such as welding wire, for example. In some arc welding systems, such as MIG (Metal Inert Gas) welding systems, metal wire is used as an electrode to produce an arc. The welding wire also acts as filler material for the weld and is consumed during the welding process. Typically, the welding wire is fed from a wire feeder to a hand-held welding gun. A drum may be used to supply the welding wire to the wire feeder. A typical drum used for storing welding wire, or other products and materials, is a hollow cylinder formed of a cellulosic material, such as cardboard, along with various metal parts for support. During lifting, the base of the drum cannot support the weight of the welding wire without some type of non-cellulosic support, such as a pallet straps or metal structures.

Once the wire is consumed, the drums typically are discarded because the drums cannot be recycled easily. Recycling is difficult because the fibrous portion of the drum must be separated from the metal portion to recycle either the fibrous portion or the metal portion. That operation can be complex and time consuming. Thus, a typical drum owner ultimately pays to dispose of the empty drum as refuse, rather than regaining some of the cost of the fiber drum by recycling.

BRIEF DESCRIPTION

In certain embodiments, a wire container is provided with a housing made of a recyclable material. The wire container has a peripheral wall defining a boundary from a first end to a second end of the housing, a plurality of end portions folded inwardly across the second end to define an end wall, and a plurality of support structures coupled to the end wall. In some embodiments, the housing has a cylindrical wall and the second end has a plurality of triangular portions folded radially inward.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, some of the embodiments of the present technique provide for a recyclable drum with a base of inwardly folded portions, laminated support structures and a flanged cylindrical lid. The base provides enough strength to support lifting the drum from the top of the drum; in other embodiments, the drum may be lifted from the bottom. Another embodiment provides for a method of manufacturing the drum and constructing the base from inwardly folded portions, laminated support structures, and a flanged cylindrical lid, as is explained in greater detail below. In some embodiments, an outside-fitting cover is used, while in others an inside-fitting cover is used. Of course, such embodiments are merely exemplary of the present technique, and the appended claims should not be viewed as limited to those embodiments.

Figures 1, 2:
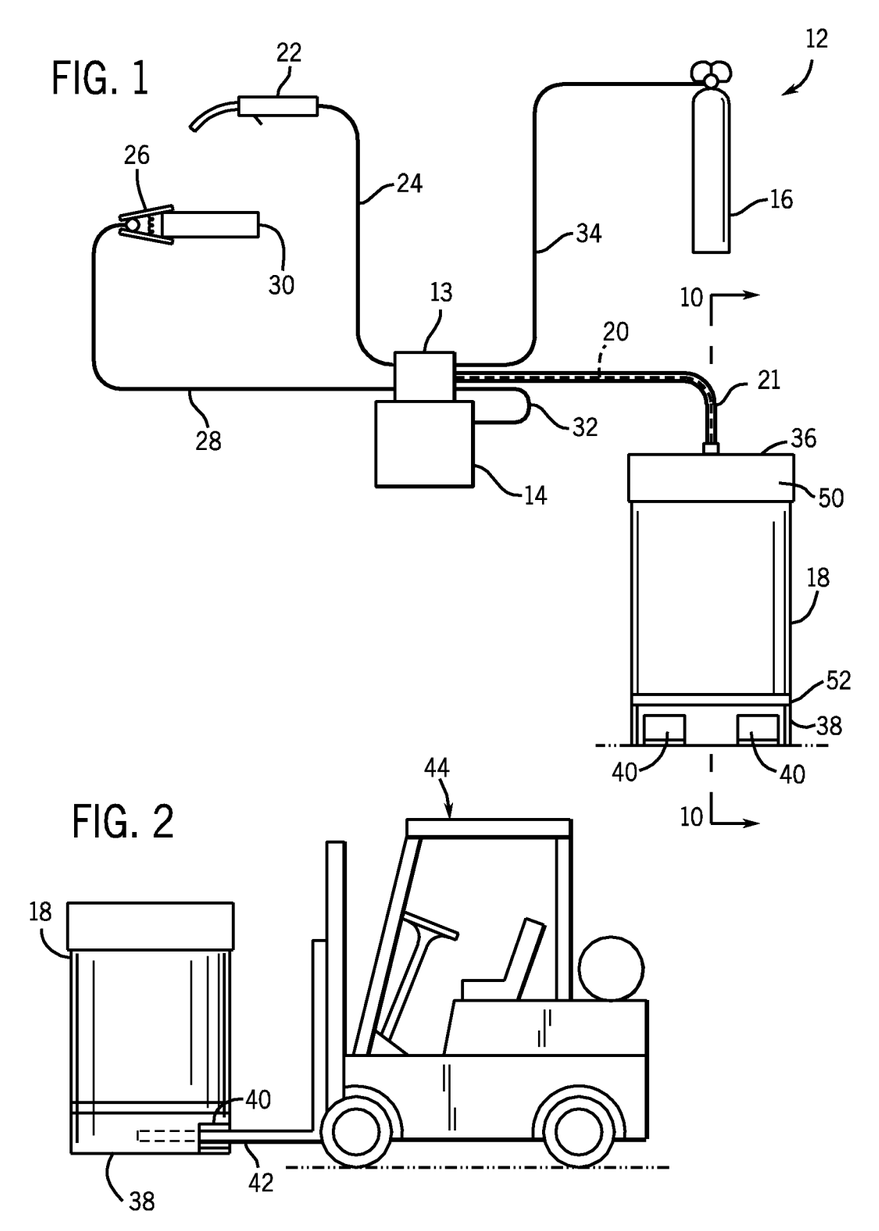
FIG. 1 is a diagrammatical view of a wire welding system, according to an exemplary embodiment of the present technique.
FIG. 2 is an elevational view illustrating the lifting of a fiber drum by a forklift, according to an exemplary embodiment of the present technique.

Referring generally to FIG. 1, a wire-welding system 12, such as a MIG welding system, is featured. In the illustrated embodiment, wire-welding system 12 comprises a wire feeder 13, a power source 14, a gas cylinder 16, and a recyclable container 18 containing welding wire 20 and covered with an outside-fitting cover 50. Preferably, the recyclable container 18 is comprised of a fiber material, such as cellulosic paper, paperboard, or cardboard. As discussed below, the container 18 has a wire support or base, e.g., base 52, which includes inwardly folded portions and laminations to increase the carrying capacity of the container 18 without the use of metal, extended straps, and so forth.

The power source 14 provides electricity to the wire feeder 13; the gas cylinder 16 provides inert gas to the wire feeder 13; and the container 18 provides welding wire 20 to the wire feeder 13 via a conduit system 21. In the illustrated embodiment, the wire feeder 13 provides electricity, welding wire 20, and inert gas to a welding torch 22. The wire, gas, and electricity are coupled to the torch 22 by a welding cable 24. In addition, a work clamp 26 is coupled to the wire feeder 13 by a ground cable 28. The work clamp 26 is secured to a workpiece 30 to electrically couple the workpiece 30 to the wire feeder 13. The torch 22 controls the operation of the system 12. When the torch 22 is activated, welding wire 20 is fed through the torch 22 by the wire feeder 13. When the welding wire 20 contacts the workpiece 30, an electrical circuit between the workpiece 30 and the wire feeder 13 is completed and an electric arc is produced. The electric arc melts the workpiece 30 and welding wire 20 at the point of contact. The inert gas shields the molten area from contaminants. A power cable 32 conducts electricity from the power source 14 to the wire feeder 13. A hose 34 channels gas from the gas cylinder 16 to the wire feeder 13.

In the illustrated embodiment, the container 18 is a hollow, generally cylindrical fiber drum. However, the container 18 may have a shape other than a cylindrical shape. For example, the container 18 may be square, hexagonal, octagonal, etc. A spool of welding wire 20 is disposed within the hollow interior of the container 18.

In the illustrated embodiment, the container 18 rests on or is secured to a separate bottom support 38. Bottom support 38 has at least one, and as illustrated, a plurality of holes, or recesses, 40. As best illustrated in FIG. 2, bottom support 38 is adapted to enable the forks 42 of a forklift 44, or other member of a lifting device, to enter one or more of the plurality of holes, or recesses, 40 and be positioned below the base 52 of the container 18 to lift the container 18. In the illustrated embodiment, two holes 40 are used, one for each fork 42 of the forklift 44. However, the container 18 also may be adapted with a single hole, or recess, that enables two forks 42, or a single lifting member to enter the bottom support 38. In addition, exit holes may be provided to enable the forks 42 to extend through the bottom support 38. Furthermore, a lifting device other than a forklift 44 may be used to lift the container 18 via one or more of the holes 40, or other passages or recesses. For example, lifting straps could be passed through the openings of bottom support 38 to enable an overhead crane to lift the container 18. Other lifting devices adapted to lift the container from the bottom may also be used, either through the use of the holes 40 or inserted directly under the base 52.

Figure 3:
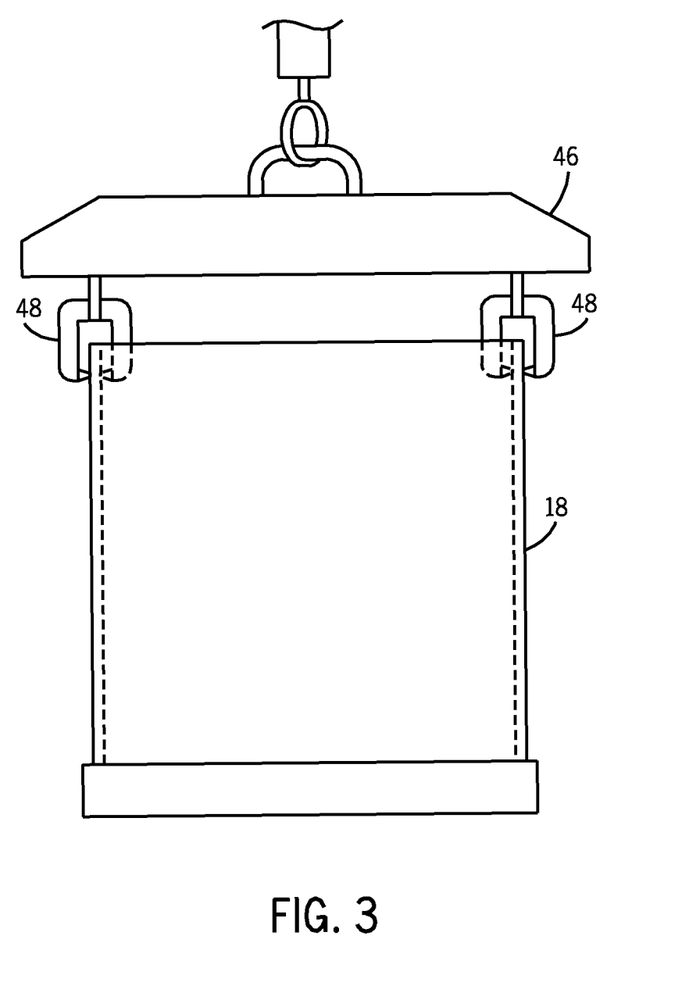
FIG. 3 is an elevational view illustrating the lifting of a fiber drum by an overhead lifting mechanism, according to an exemplary embodiment of the present technique.

FIG. 3 shows an alternative embodiment in which the container 18 is lifted from the top. In the illustrated embodiment, a lifting mechanism 46 is shown and includes clamps 48 that grip the container 18 at the open end. In this manner, a bottom support 38 as illustrated in FIGS. 1 and 2 is not used to lift the drum. The lifting mechanism 46 may include any type of clamps, grips, or other device that can attach to and lift the drum from the top. Such clamps or grips may be adapted to grip a portion of the top of the drum or to grip the entire circumference of the top of the drum. As discussed below, the illustrated container 18 has a base 52 strong enough to support the weight of the welding wire 20 when lifted from the top. For example, the base of the container 18 may include inwardly folded portions and laminations to increase the wire carrying capacity of the container without any non-cellulosic supports.

Figure 4:
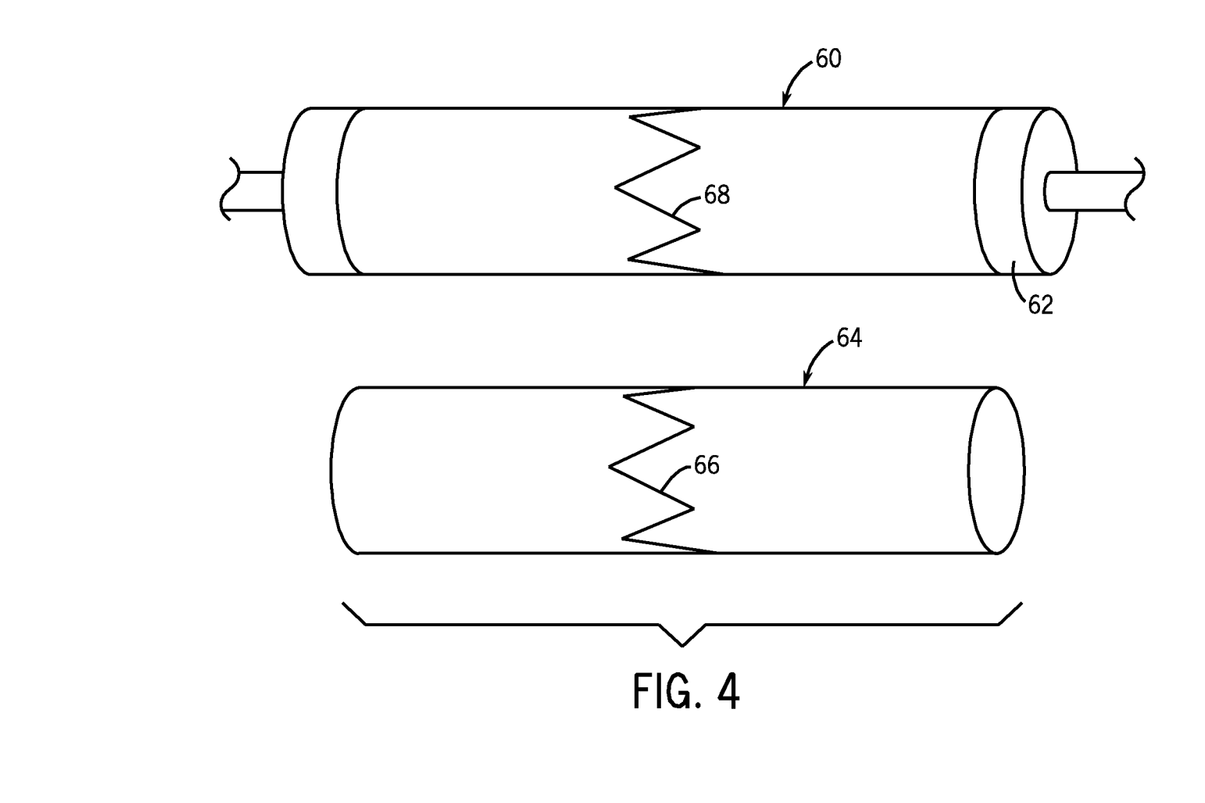
FIG. 4 is an illustration of a manufacturing process in accordance with an embodiment of the present technique.

Referring now to FIG. 4, an exemplary manufacturing process for creating a container 18 is shown. A sheet of recyclable fiber material 60 is secured on a rotating mandrel 62. In this exemplary process, the fiber sheet 60 has a length of 87.5 inches and a diameter of 23 inches, but other lengths, diameters or dimensions may be used depending on the desired drum size. A cylindrical cutter 64 is positioned adjacent to the fiber sheet 60 and mandrel 62. The cylindrical cutter 64 has zig-zagging cutting edges 66, and the cutter is positioned such that the cutting edges 66 align with the center of the mandrel 62 and the fiber sheet 60. To cut the fiber sheet 60, the mandrel 62 rotates and the fiber sheet 60 is brought into contact with the cutter 64. The cutting edges 66 cut a zig-zagging pattern 68 of folding portions into the fiber sheet 60. In this exemplary process, the folding portions have a triangular shape; however, such shapes are determined by the cutting edges 66 of the cutter 60, and other shapes may be used.

Figure 5:
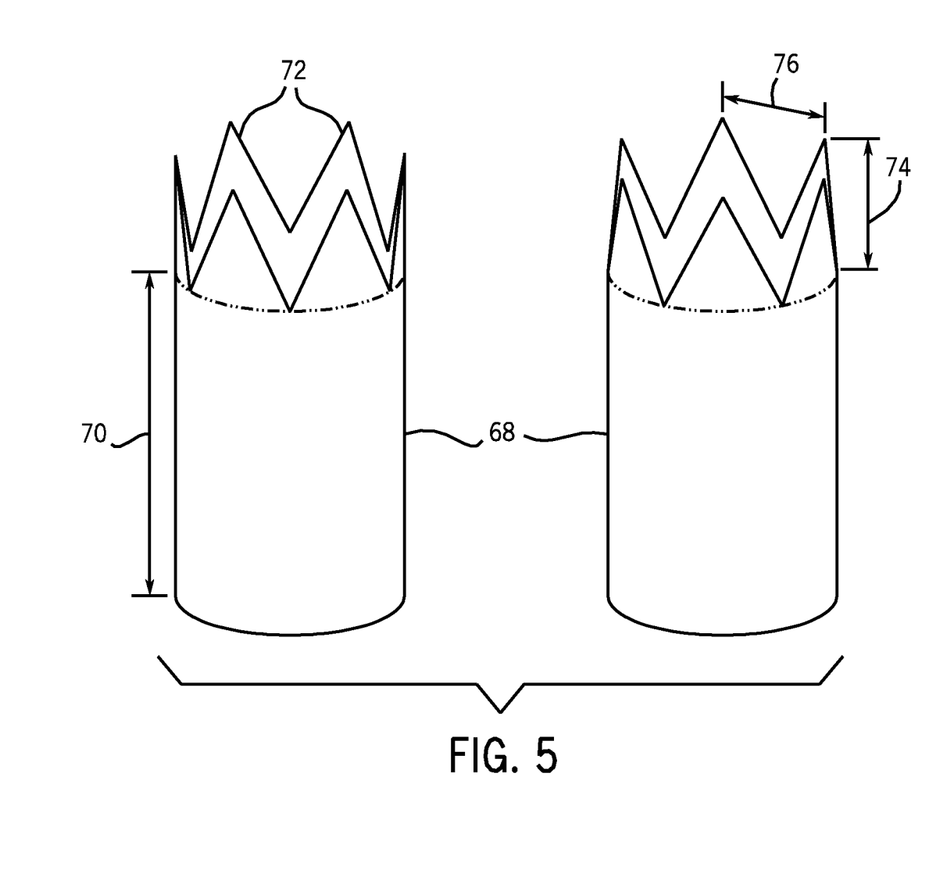
FIG. 5 is a perspective view of two fiber drums during the manufacturing process in accordance with an embodiment of the present technique.

Turning now to FIG. 5, the result of the cutting process described in FIG. 4 is shown. After the cutting process, the fiber sheet 60 is split into two fiber cylinders 68. In this exemplary embodiment, the length 70 of each cylinder 68, excluding the folding portions, is 32.25 inches. As a result of the cutting process described in FIG. 4, each cylinder 68 has triangular-shaped folding portions 72. In this exemplary embodiment the length 74 of each folding portion 72 is 11.5 inches, and the distance 76 between the centerpoints of adjacent folding portion is 6 inches. As will be described below, the folding portions are folded inward to form an enclosed end 75 of the cylinder 68.

Figure 6:
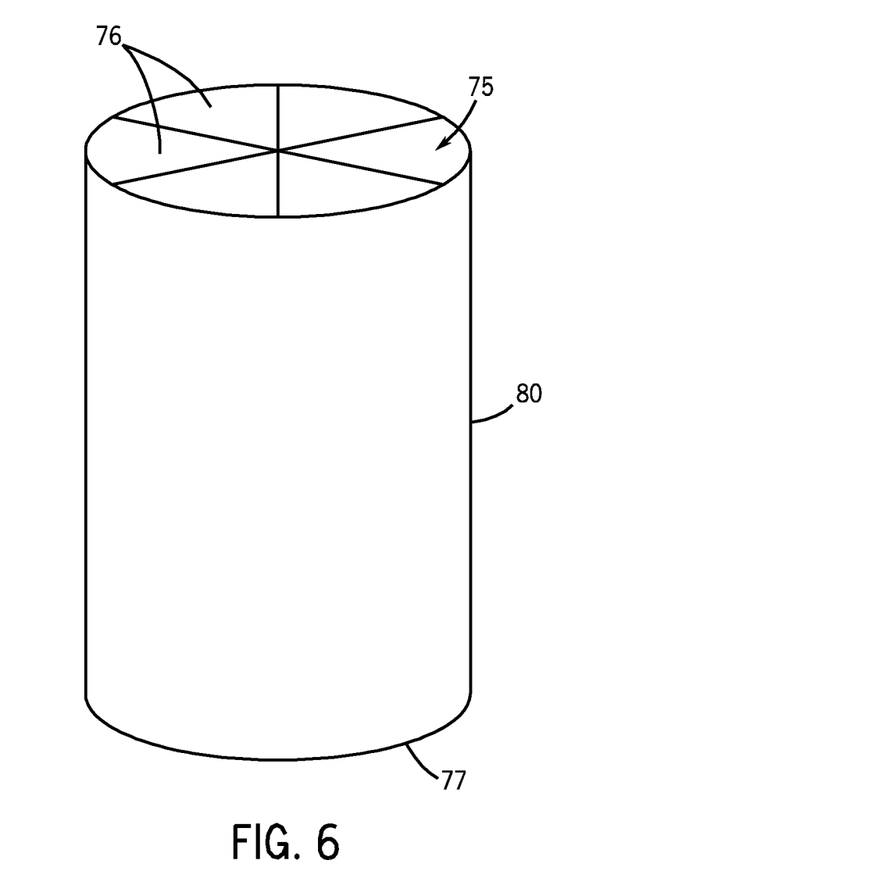
FIG. 6 is a perspective view of a fiber drum with an enclosed end, according to an exemplary embodiment of the present technique.

FIG. 6 shows an exemplary embodiment of a recyclable drum 80 after folding portions 72 have been folded inward to form the enclosed end 75. The drum 80 has the enclosed end 75 and an opposite open end 77. In the exemplary embodiment, the folding portions 76 are triangular-shaped and folded radially inward to seal and form the enclosed end 75. In alternate embodiments, the folding portions 76 may have a different shape or may overlap when folded inward. The enclosed end 75, in conjunction with the additional support structures described below, generally provide the desired bottom strength of the drum 80. In certain embodiments, the drum 80 may be constructed to support over 500 lbs, over 1000 lbs, or over 1500 lbs.

Figure 7:
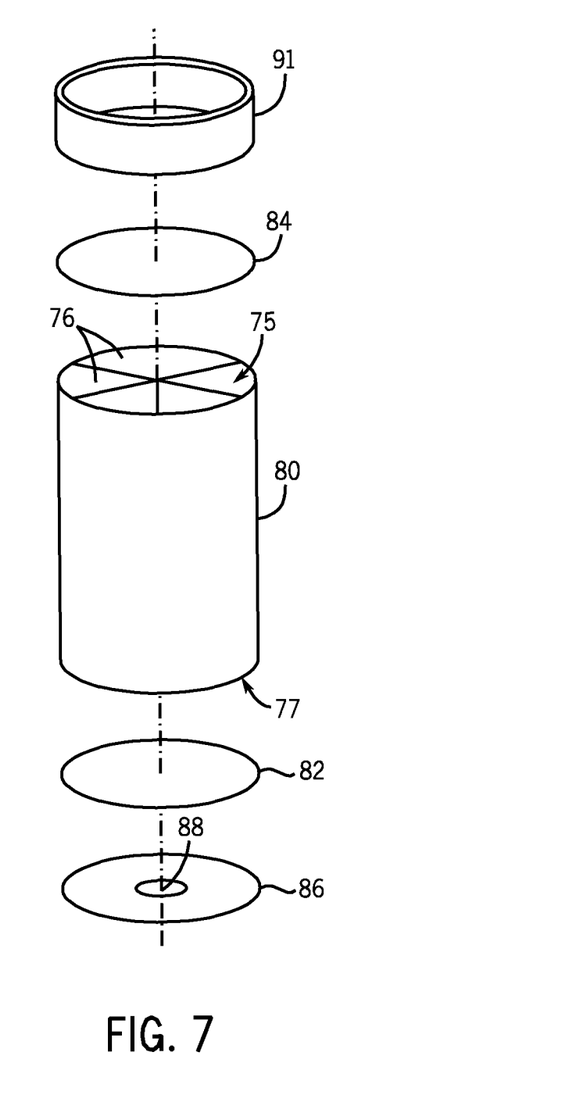
FIG. 7 is an exploded view of the fiber drum and base, in accordance with an embodiment of the present technique.

Referring now to FIG. 7, an exploded view of an exemplary fiber drum 80 and all the components that construct the base 52 of the drum are shown. As discussed above, the enclosed end of the drum 80 is formed by the folding portions 76 being folded inward. A plurality of support structures 82, 84, and 86 are secured to the enclosed end 75 of the drum 80, such as by glue or other adhesive. The support structures 82, 84, and 86 are constructed from fiber sheets, but may be constructed from other suitable material. Further, the material may be chosen to provide additional strengthening properties to the enclosed end of the drum, and all of the support structures need not be constructed of the same material. Circular support structure 82 is secured to the inside of the enclosed end 75 of the drum 80. A second circular support structure of fiber sheet 84 is secured to the outside of the enclosed end 75 of the drum 80, such that the folding portions 76 that form the enclosed end 75 of the drum 80 are laminated by circular support structures 82 and 84. A third circular support structure 86 is secured to circular support structure 82 inside the drum 80. The third circular support 86 structure has a hole 88 in the center for insertion of a plastic tie down plug. To further seal and support the enclosed end 75 of the drum 80, a flanged cylindrical lid 91 is secured to the outside of the enclosed end 75 of the drum 80 over the circular support piece 84. The bottom of the cylindrical lid 91 extends about 0.5-2 inches toward the center of the enclosed end 75 of the drum 80. In this exemplary embodiment, the outside diameter of the cylindrical lid 91 is about 23 inches, and the inside diameter of the lid is about 21-22.5 inches. The lid extends about 6 inches along the side wall of the drum 80 towards open end 77. As with the circular support pieces 82, 84, and 86, the cylindrical lid 91 may be constructed from a fiber sheet or composed of other suitable recyclable material. In certain embodiments, the drum 80, the support structures 82, 84, and 86, and the lid 91 are made entirely of cellulosic material without any metal or other dissimilar material that cannot be recycled together.

Figure 8:
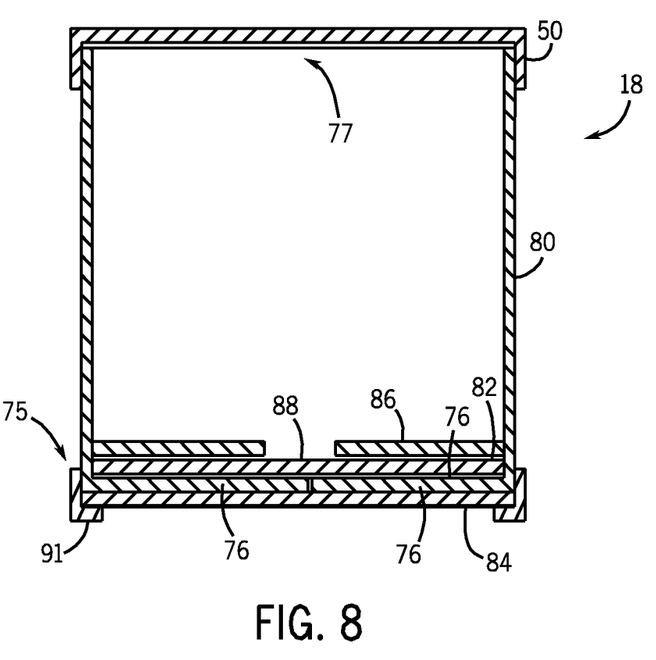
FIG. 8 is a cross-sectional view of an assembled fiber drum with an outside-fitting lid, according to an exemplary embodiment of the present technique.

Referring now to FIG. 8, a cross-section of a the fiber drum 80, constructed in accordance with an embodiment of the present technique, is shown with an outside-fitting cover 50 over the open end 77 of the drum 80. The drum 80 has a base 52 formed and sealed by folded portions 76, the inside-fitting circular support structure 82, the outside-fitting circular support structure 84, the inside-fitting circular support structure 86, and the flanged cylindrical lid 91 coupled together to form a layered structure as discussed above. For example, the layered structure may have the layers 76, 82, 84, 86, and 91 laminated together with a suitable adhesive. To enclose the open end 77 of the drum 80, an outside-fitting cover 50 is secured on the open end of the drum 80 as shown in FIG. 8. The outside-fitting cover 50 extends down the sides of the drum 80 towards the enclosed end 75. The outside-fitting cover 50 may be adapted from fiber sheets or other suitable material. Further, the outside-fitting lid 50 need not be comprised of recyclable material and may be reused on different drums, instead of being recycled along with the drum 80.

Figure 9:
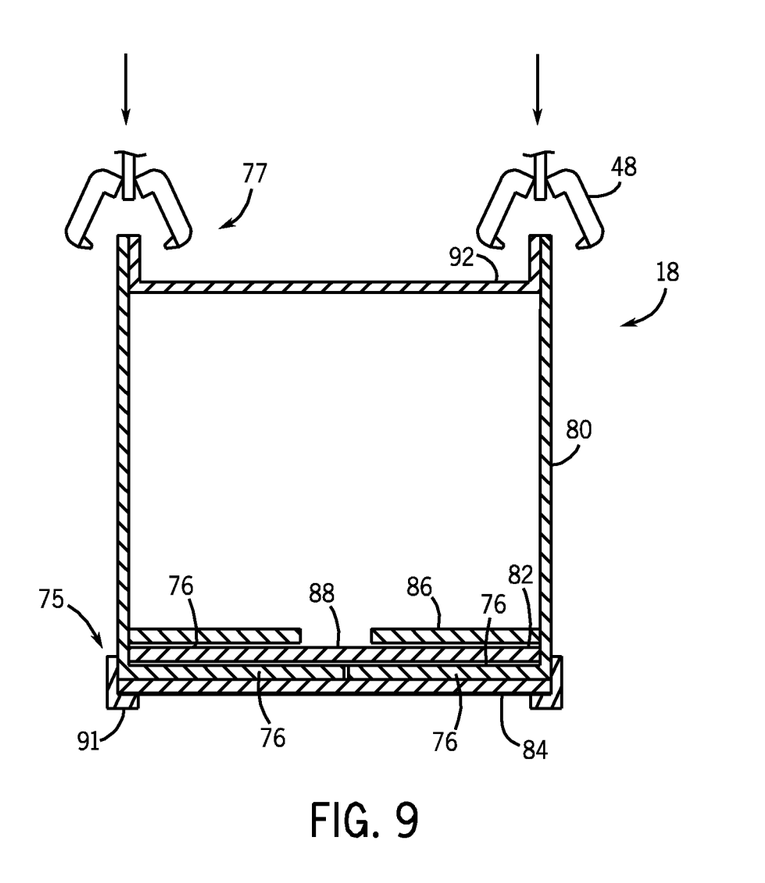
FIG. 9 is a cross-sectional view of an assembled fiber drum with an inside-fitting lid, according to an exemplary embodiment of the present technique.

Turning now to FIG. 9, a cross-section of the fiber drum 80, constructed in accordance with an embodiment the present technique, is shown with an inside-fitting cover 92. The inside-fitting cover 92 is recessed into the open end 77 of the drum 80. The edges of the inside-fitting cover 92 extend up towards the open end 77 of the drum 80. As with the outside-fitting cover 50 discussed above, the inside-fitting cover 92 may be constructed from fiber sheets or composed of other suitable material, and may be reused on different drums. In this alternative embodiment, the inside-fitting cover 92 enables lifting the drum with the cover 92 in place, using an overhead lifting mechanism, also shown in FIG. 3. As shown in the figure, when lifting, lowering, or otherwise moving the drum, the clamps 48 grab the outside edge of the drum 80 and the inside edge of the extended portions of the inside-fitting cover 92. The folding portions 76, the circular support structures 82, 84, and 86, and the flanged cylindrical lid 91 cooperatively provide enough strength at the bottom of the drum 80 to support the weight of the welding wire during overhead lifting.

Figures 10, 11:
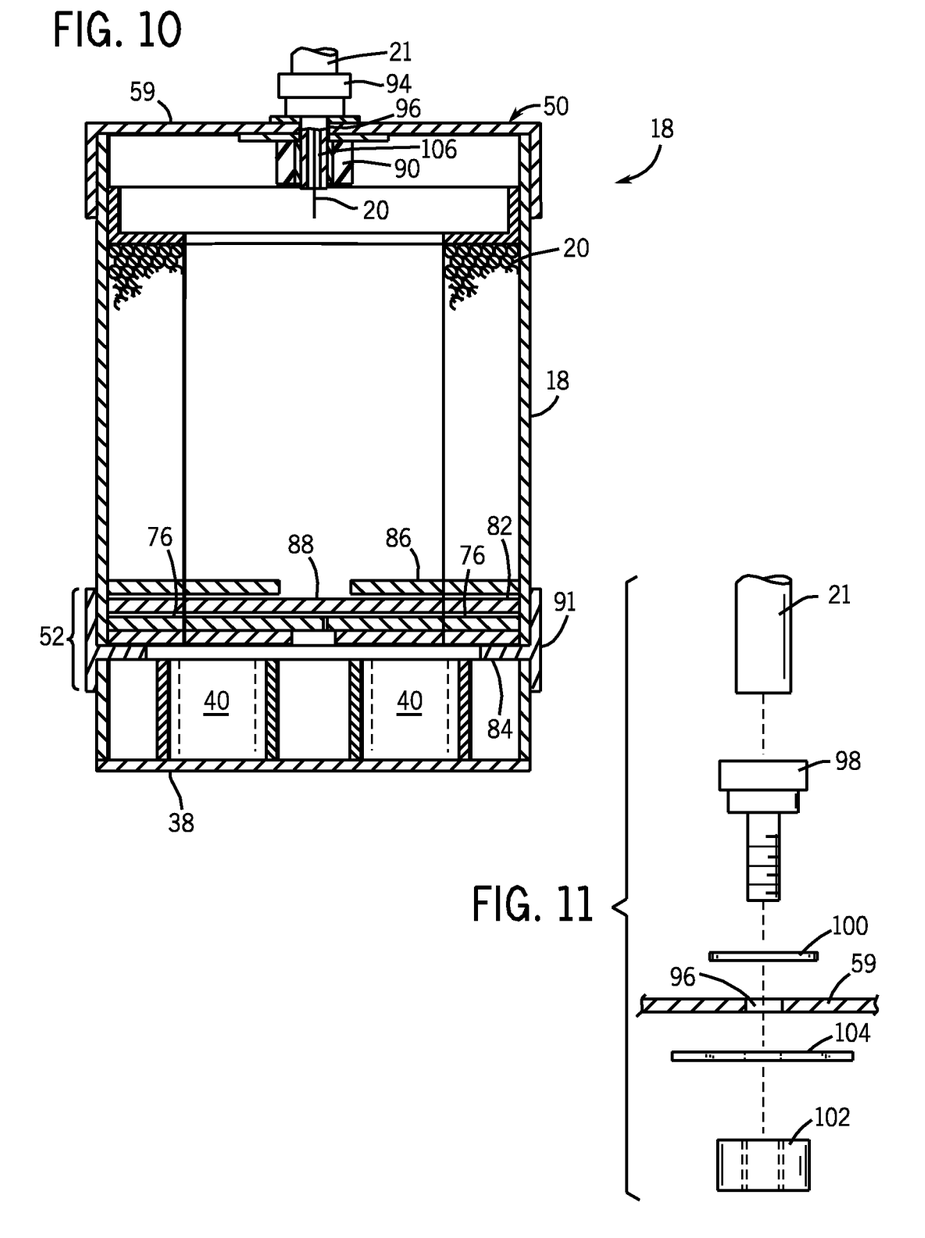
FIG. 10 is a cross-sectional view of the fiber drum of FIG. 1, taken generally along line 10-10 of FIG. 1.
FIG. 11 is an exploded view of the fiber drum and adapter assembly, according to an exemplary embodiment of the present technique.

Referring generally to FIG. 10, a cross-sectional view of the container of FIG. 1 is illustrated. A conduit adapter assembly 94 is secured to outside-fitting cover 50 to couple the cover 50 and the conduit system 21. The conduit adapter assembly 94 is inserted through the hole 96 in the cover 50. The conduit adapter assembly 94 is adapted to guide wire 20 from the container 18 into the conduit system 21. Other adapter assemblies, such as a conical adapter, may also be used in conjunction with the outside-fitting cover 50 or inside-fitting cover 92. The bottom support 38 is shown attached to the container 18. The cylindrical lid 91 has been modified to extend over bottom support 38 to provide for attachment of bottom support 38.

As best illustrated in FIG. 11, the conduit adapter assembly 94 comprises a quick-disconnect 98, a washer 100, a wire guide 102, and a plate 104. The quick-disconnect 98 and wire guide 102 are adapted to secure to each other through the hole 96 in the top portion 59 of the cover 50 and through holes in the washer 100 and plate 104, respectively. The quick-disconnect 98 and wire guide 102 form a path 106 for welding wire 20 to pass through a hole 96 in the container 18. The conduit adapter assembly 94 thereby guides the wire into the conduit system 21 and protects the outside-fitting cover 50 of the container 18 from damage due to abrasion from the welding wire 20. In addition, the quick-disconnect 98 is adapted to be quickly connected to or disconnected from the conduit system 21. Furthermore, the washer 100 and plate 104 distribute stress caused by the conduit adapter assembly 94 over a larger area of the top portion 59 of the cover 50.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wire container, comprising:
   a housing consisting essentially of a recyclable fiber material, the housing comprising:
      a peripheral wall defining a boundary leading from a first end to a second end of the housing;
      a plurality of end portions of the housing folded inwardly across the boundary at the second end to define an end wall; and
      a plurality of support structures coplanar with and coupled to the end wall and extending across the plurality of end portions, wherein the plurality of support structures comprises a flanged support that extends across the boundary at the second end of the housing, the flanged support comprises an outer lip coupled to the peripheral wall, and the flanged support has a central opening extending therethrough.

2. The container of claim 1, wherein the plurality of end portions comprises radial folds directed inwardly toward a center of the boundary.

3. The container of claim 1, comprising a plug inserted into the plurality of support structures.

4. The container of claim 1, comprising a cover that extends across the boundary at the first end of the housing, wherein the cover frictionally engages the boundary of the peripheral wall.

5. The container of claim 1, comprising a wire conduit.

6. A welding wire and container assembly, comprising:
   a housing consisting essentially of a recyclable non-metallic material, the housing comprising:
      a cylindrical wall having a first end and a second end, wherein the cylindrical wall comprises a plurality of triangular portions folded radially inward at the second end;
      a support structure coupled to the plurality of triangular portions to provide a layered end assembly, wherein the support structure comprises a central planar portion and an outer lip coupled to the cylindrical wall, the outer lip comprises a central opening extending therethrough, and the central opening is smaller than an interior of the cylindrical wall; and
   a coil of welding wire disposed in the housing and supported by the layered end assembly.

7. The assembly of claim 6, comprising a cover that extends across the first end of the cylindrical wall, wherein the cover frictionally engages the cylindrical wall to secure the cover to the housing.

8. The cover of claim 7, wherein the cover comprises a wire passage extending therethrough.

9. The cover of claim 7, wherein the cover comprises a conical extension having a wire passage extending therethrough.

10. The assembly of claim 6, wherein the triangular portions generally meet at a central region inside the cylindrical wall.

11. The assembly of claim 6, wherein the layered end assembly comprises a plurality of support structures laminated with the plurality of triangular portions.

12. A welding wire container, comprising:
   a recyclable cellulosic cylinder comprising a laminated base, wherein the laminated base comprises a plurality of end portions of the recyclable cellulosic cylinder folded inwardly toward a central region of the recyclable cylinder, wherein the laminated base supports a coil of welding wire weighing at least 500 pounds during lifting of the recyclable cellulosic cylinder, and the recyclable cellulosic cylinder completely excludes metal supports.

13. The container of claim 12, wherein the plurality of end portions are triangular folds, and the laminated base excludes metal supports.

14. The container of claim 1, wherein the end wall defined by the plurality of end portions and the plurality of support structure supports at least 500 pounds.

15. The container of claim 1, wherein the housing is made entirely of recyclable fiber material without any metal.

16. The container of claim 1, wherein the peripheral wall is cylindrical, the plurality of end portions are triangular, the plurality of support structures are disk-shaped, the plurality of end portions and the plurality of support structures are laminated to one another without metal, and the end wall defined by the plurality of end portions and the plurality of support structure supports at least 500 pounds.

17. The assembly of claim 6, wherein the layered end assembly supports the coil of welding wire weighing at least 500 pounds, and the housing is made entirely of recyclable fiber material without metal supports.

\* \* \* \* \*